Nov. 23, 1948.                    D. M. BERGES                    2,454,371
                              EXPLOSION-PROOF MOTOR
                               Filed June 8, 1946
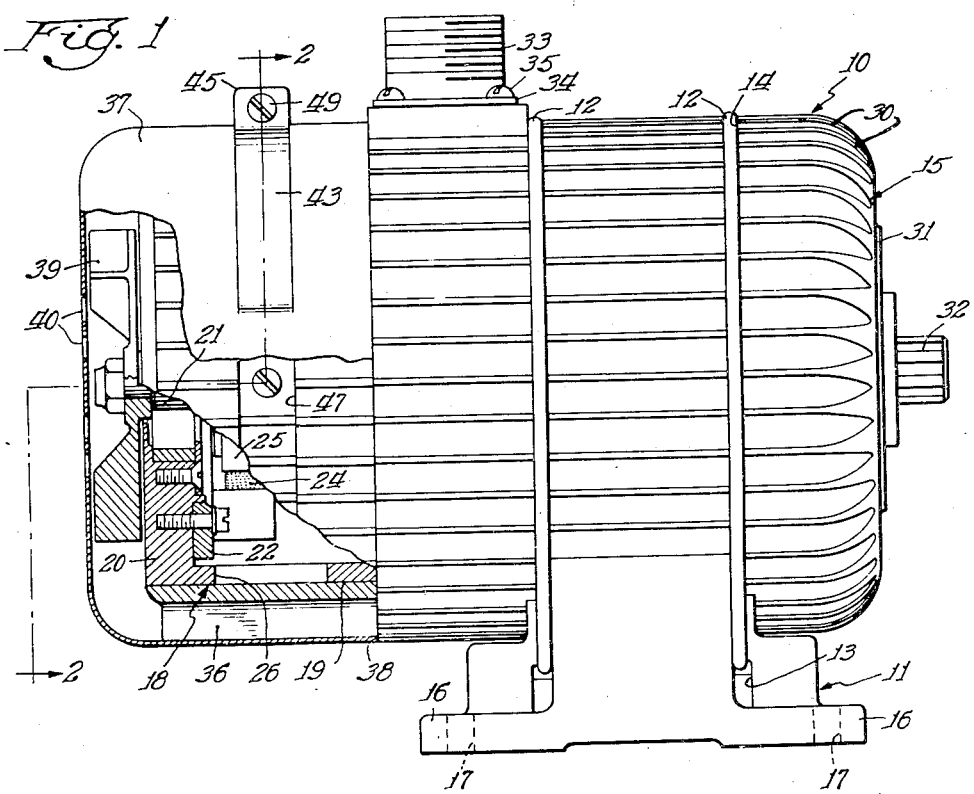
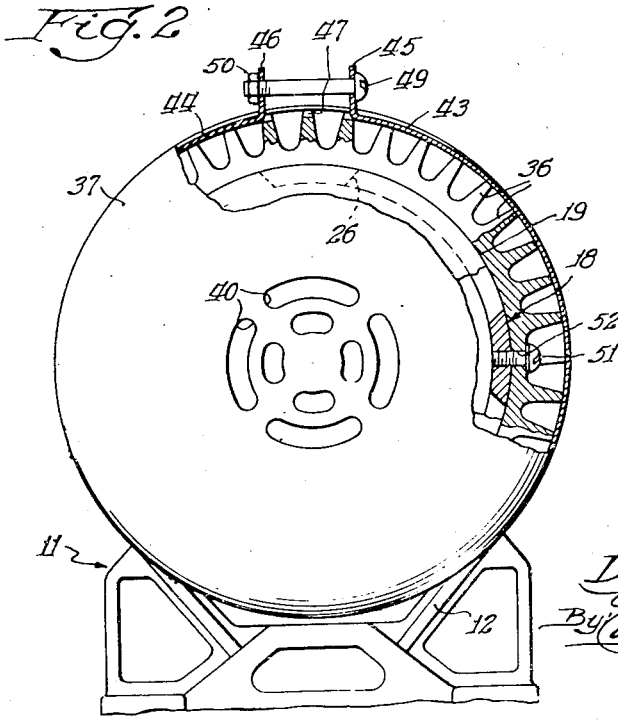
Inventor:
Donald M. Berges
By Edward C. Gritzbaugh
                    Atty.

Patented Nov. 23, 1948

2,454,371

UNITED STATES PATENT OFFICE 2,454,371

EXPLOSION-PROOF MOTOR

Donald M. Berges, Cleveland Heights, Ohio, assignor, by mesne assignments, to Borg-Warner Corporation, Chicago, Ill., a corporation of Illinois Application June 8, 1946, Serial No. 675,501

5 Claims. (Cl. 171—252)

My invention relates to motors and more particularly to mechanism for rendering a motor explosion-proof.

Electrically driven motors are employed for many purposes and in their operation generate heat which may be damaging to the motor and may even result in disintegration when the heat generated is excessive. It is known to provide a cover for such motors, said cover having heat radiating fins whereby the heat generated is more readily dissipated. It is also known to provide an impeller driven by the motor, which propeller circulates air about the motor and its casing to carry off heat which is generated. It is also known to combine the two aforementioned heat dissipating means, namely a fan driven by the motor together with a housing or shell having heat radiating fins.

Many motor housings, or shells secured about said housings, which employ heat radiating fins have previously had the disadvantage of preventing ready access to portions of the electric motor which require adjustment, the brushes being an example of such portions.

It is a primary object of my invention, therefore, to provide an explosion-proof motor employing a fan or impeller driven by the motor together with a shell surrounding said motor and having heat radiating fins, which motor has its portions readily accessible for adjustment or repair. To this end I provide a novel construction of the shell together with novel means for securing a shroud or cover to said shell and about the fan or impeller.

It is a further object to provide a support for said motor which support is readily movable relative to said shell upon the release of securing means so that openings through said housing may be exposed to provide ready access to portions of the motor which need adjustment.

Other objects and advantages will become apparent as my invention is fully described hereinafter, reference being made to the accompanying drawing which forms a part of this application, wherein:

Fig. 1 represents a view, partially in section and partially in elevation, of a motor embodying my invention; and Fig. 2 is a view taken on the planes of line 2—2 of Fig. 1.

Like reference numerals in the several views indicate like parts of the mechanism.

Referring now to the drawing, the numeral 10 indicates the motor together with its supporting means and its heat dissipating means. The motor 10 is carried in a bracket or cradle 11 and is secured thereto by spring wires or binding wires 12, which pass through slots 13 in the bracket 11. The wires 12 are each seated in a groove 14 of the motor 10, said grooves being formed in the shell which is indicated generally at 15. The bracket 11 has flanges 16 in which are formed holes 17 so that bolts or screws may be passed through the holes and secured to a frame, wall, or other support (not shown). A support, indicated generally at 18, for the electric motor 10 is cylindrical in shape as at 19 and has an end wall 20 which serves to carry the motor shaft 21. Support 18 has a sliding fit within the shell 15. Secured internally of said support 18 is a brush supporting plate 22, one brush being shown at 24 and being in contact with the commutator 25. Circumferentially formed slots 26 are located in the cylindrical portion 19 of the support 18 through which slots access may be had for adjusting the brushes, such as brush 24, when the shell 15 and support 18 have been moved relative to each other so as to expose said openings 26.

The shell 15 is formed with a plurality of heat radiating fins 30 which extend longitudinally with respect to the axes of the shell 15, support 18 and the electric motor. An end wall 31 of said shell has an opening through which the driving shaft 32 of the electric motor extends. A terminal post 33 is positioned on top of the motor 10 and secured in place by a plate 34 and screws 35 which are threaded in the shell 15. The fins 30 are longer radially than the fins 36 shown at the left hand side of Fig. 1 and a locating shoulder 38 is thereby formed at their juncture.

Cover or shroud 37 fits over the left end of shell 15, as viewed in Fig. 1, and may be slid over the fins 36 as far as the shoulder 38. This cover forms a protection from contact with the rotating fan or impeller 39 which is secured to the shaft 21 of the electric motor. The cover 37 has a plurality of air passageways 40 so that when the motor is driven and the fan 39 rotates with the motor shaft 21 air may be sucked through the holes 40 thus providing circulation of air along the fins 36 and 30 for dissipating heat generated by the motor.

To secure the cover 37 in place about the shell 15 there is stamped from the cover 37 two straps 43 and 44 each of which is integrally joined with the cover 37 at one end and which are bent into opposing flanges 45 and 46 at their free ends. A groove 47 is formed circumferentially in the fins 36 of shell 15 and has a width substantially the same as the width of straps 43 and 44.

Flanges 45 and 46 have opposing holes through which is inserted a bolt 49. A nut 50, when threaded onto said bolt 49, tends to draw the straps 43 and 44 radially inwardly so that they are positioned in the groove 47 of shell 15 thereby to hold the cover 37 in place on the shell.

As will be seen most clearly in Fig. 2, screws, such as screw 51, pass through holes 52 in the shell 15 and are threaded into the support 18 for securing the shell 15 and support 18 against relative movement. The screws 51 when threaded into position are seated between fins 36 and radially inwardly of the outer extremities of said fins so that cover 37 readily passes over them.

When it becomes necessary to make adjustments of the brushes, such as brush 24, for example, the nut 50 is unthreaded with respect to bolt 49 so that the straps 43 and 44 of their own resiliency will rise from the groove 47 in shell 15 whereupon the cover 37 may be slid off of the shell 15. Screws 51 are then unthreaded from the motor support 18 whereupon the support 18 may be moved relative to the shell 15 so as to expose the openings 26 in support 18 to provide access to the brushes.

It will be seen that I have provided by the foregoing constructions an explosion-proof motor which has its adjustable parts readily accessible in spite of the use of a heat radiating shell and an air impeller. It will be appreciated, of course, that my invention is applicable not only to electrically driven motors but to any motor power delivering means, or other rotating mechanism, which generates heat during its operation. Consequently, I do not intend to be limited to the illustrated form of my invention since changes and modifications thereof may be made without departing from the scope of my invention as set forth in the appended claims.

I claim:

1. Cooling means for a heat generating mechanism having adjustable parts and a rotatable shaft, supporting means for said mechanism having openings to provide access to said adjustable parts, a shell having heat radiating fins, said shell being removably secured about said supporting means and over said openings, a fan connected with said rotable shaft and positioned externally of said supporting means, said fan causing a flow of air along said heat radiating fins, covering means surrounding said fan and fitting over a portion of the heat radiating fins of said shell, a groove formed in the fins of said shell, clamping means formed integrally with said covering means and adapted to be releasably secured in said groove to retain the covering means in place, said adjustable parts being made accessible by removal of said covering means and by relative movement between said supporting means and shell to expose the openings in said supporting means.

2. Cooling means for a heat generating mechanism having adjustable parts and a rotatable shaft, supporting means for said mechanism having openings to provide access to said adjustable parts, a shell having heat radiating fins, said shell being removably secured about said supporting means and over said openings, a fan connected with said rotatable shaft and positioned externally of said supporting means, said fan causing a flow of air along said heat radiating fins, covering means surrounding said fan and fitting over a portion of the heat radiating fins of said shell, a groove formed in the fins of said shell, clamping straps formed from said cover, means for drawing said straps into said groove to retain the cover in place, said adjustable parts being made accessible by release of said last-named means, removal of said covering means from said shell, and relative movement between supporting means and shell to expose the openings in said supporting means.

3. Cooling means for a heat generating mechanism having adjustable parts and a rotatable shaft, a support for said mechanism having openings to provide access to said adjustable parts, a shell having heat radiating fins extending longitudinally of its axis, said shell being removably secured about said support and over said openings and having a sliding fit with respect to said support said fins at one end of the shell being reduced radially whereby a locating shoulder is formed, a fan connected with said shaft and positioned at one end of the support and externally thereof for causing a flow of air along said fins, a cover surrounding said impeller and fitting over the reduced end of said shell and into abutting relation with said locating shoulder, a groove formed in the fins which have a reduced radius, clamping means formed from said cover and adapted to be releasably secured in said groove to retain the cover in place, said adjustable parts being made accessible by removal of said cover and by relative movement between said support and shell to expose the openings in the support.

4. An arrangement for normally enclosing and cooling a rotatable mechanism subject to heat generation and affording ready access to said mechanism when desired, said arrangement comprising; a first main housing for rotatably supporting said mechanism, said first housing being formed with access providing port defining means in the side wall thereof adjacent said mechanism; a second housing telescopingly received about said first housing, said second housing having a wall surface portion effective to close said port defining means when moved into telescoped overlapping relation thereto, said second housing being formed with axially extending heat radiating fins, means for releasably fastening said second housing to said first housing; a third housing removably mounted about said second housing and covering only a portion thereof and defining with said fins, a plurality of axially extending conduits, said third housing having a transversely extending terminal wall formed with generally centrally located ports; an air impeller located within said third housing adjacent said ports and functioning to move air through said ports and along said conduits for the purpose of cooling said mechanism; and a second removable fastening means effective to fasten said third housing to said second housing; said access port defining means being readily uncovered by the release of said second fastening means, the removal of said third housing from said second housing, the release of said first fastening means and the axial adjustment of said second housing relative to said first housing to thus uncover said access port defining means.

5. An arrangement for normally enclosing and cooling a rotatable mechanism subject to heat generation and affording ready access to said mechanism when desired, said arrangement comprising; a first main housing for rotatably supporting said mechanism, said first housing being formed with access providing port defining means in the side wall thereof adjacent said mechanism; a second housing telescopingly received about said first housing, said second housing having a wall surface portion effective to close said port defining means when moved into telescoped overlapping relation thereto, said second housing being formed with axially extending heat radiating fins, a third housing removably mounted about said second housing and covering only a portion thereof, and defining with said fins, a plurality of axially extending conduits, said third housing having a transversely extending terminal wall formed with generally centrally located ports; an air impeller located within said third housing adjacent said ports and functioning to move air through said ports and along said conduits for the purpose of cooling said mechanism; and removable clamping means effective to fasten said third housing to said second housing; said access port defining means being readily uncovered by the release of said clamping means, the axial adjustment of said third housing in a first direction with reference to said second housing, and the axial adjustment of said second housing in the opposite direction relative to said first housing to thus uncover said access port defining means.

DONALD M. BERGES.

REFERENCES CITED

The following references are of record in the file of this patent:

FOREIGN PATENTS

| Number | Country | Date |
|--------|---------|------|
| 135,298 | Austria | Nov. 10, 1933 |
| 363,939 | Italy | Oct. 18, 1938 |